United States Patent [19]

Heim

[11] 4,159,686
[45] Jul. 3, 1979

[54] PROCESS FOR SMOOTHING THE EYE OF A NEEDLE AND NEEDLE MADE THEREBY

[75] Inventor: Helmut Heim, Membach, Belgium

[73] Assignee: Manufacture Belge d'Aiguilles S.A., Eupen, Belgium

[21] Appl. No.: 744,313

[22] Filed: Nov. 23, 1976

[30] Foreign Application Priority Data

Dec. 1, 1975 [GB] United Kingdom ............... 49291/75

[51] Int. Cl.² .............................................. D05B 85/00
[52] U.S. Cl. ........................................ 112/222; 163/5; 219/121 LM
[58] Field of Search ........................ 112/222; 223/102; 408/701; 219/121 L, 121 LM; 163/5; 148/4, 39; 128/339

[56] References Cited

U.S. PATENT DOCUMENTS

| | | | |
|---|---|---|---|
| 3,333,623 | 8/1967 | Recknagel et al. | 163/5 |
| 3,650,846 | 3/1972 | Holland | 148/4 |
| 3,862,611 | 1/1975 | Kuromegawa | 112/222 |
| 3,934,109 | 1/1976 | Shepard et al. | 163/5 |
| 3,998,259 | 12/1976 | Zocher | 163/5 |
| 4,020,319 | 4/1977 | Shepard et al. | 219/121 LM |
| 4,047,984 | 9/1977 | Belke et al. | 148/39 |

Primary Examiner—George H. Krizmanich
Attorney, Agent, or Firm—Shlesinger, Arkwright, Garvey & Dinsmore

[57] ABSTRACT

Process for smoothing the eye of a needle during maufacture using high power density radiation from a laser to melt the surfaces of the eye area and subsequently permitting the melted surfaces to solidify giving smoother surfacing.

38 Claims, 9 Drawing Figures

PROCESS FOR SMOOTHING THE EYE OF A NEEDLE AND NEEDLE MADE THEREBY

This invention relates to a process for smoothing the eye of a needle.

As is known in the needle manufacturing industry needle wire is firstly mechanically or thermomechanically worked into the final shape of a needle, then it is hardened by an appropriate heat treatment and finally coated, in general by nickel or chrome plating, to provide the needle with a bright and rust-preventive surface. It is during the first step of working the needle that the eye of the needle is perforated, in general by punching, but this provides the eye with a rough internal surface with sharp edges and burrs.

As a general rule, the cross section of the eye is in a form elongated in the longitudinal direction of the needle. In most cases it is a rectangle with two parallel sides lengthwise and two sides perpendicular thereto at each extremity of the rectangle which are rounded off in the form of a half circle. The needle surface in which the hole is perforated forms with the internal surface of the hole a substantially right-angled edge, including the regions at the extremities of the elongate eye. It is precisely at these extremities that this right-angled edge is most undesirable. Also the burrs and surface irregularities of the internal surface at each of these extremities must be eliminated. During the use of such a needle in a sewing machine the progress of the sewing thread through the eye is not a continuous movement, but a to-and-fro movement at the rhythm of the strokes of the machine, the over-all progress of the thread being in the same direction as the workpiece. Each part of the thread then, before having finally passed through the eye, has first to rub up to 40 times to-and-fro against the edges, burrs and surface irregularities at said extremities of the elongate eye. This may happen at high speeds, as industrial sewing machines have a rhythm of about 3000 strokes per minute and more.

This causes numerous thread ruptures and it is for this reason common practice to polish these extremities during the step of working the needle into its final shape, after perforating the hole which forms the eye of the needle.

Several general processes of polishing are known, such as sand-blast polishing, electrolytic polishing, or polishing by vibration in an abrasive material. These methods all have some disadvantages, either for reasons of the small dimensions involved, an insufficient production speed, or insufficient or undesirable selectivity. Thus electrolytic polishing and abrasion not only work at the edge intended to be polished, but also at the other edges and points where abrasion is not desired, while inside the hole the current density is low and the result is poor.

For these reasons, needle manufacturing has adhered to a standard polishing operation which consists of passing cotton thread covered with abrasive paste through the eye of the needle, and rubbing the thread to-and-fro through the eye against the extremities of the eye of the needle. In general several needles are so threaded in series with the same thread, which is rubbed through all the eyes of these needles. All past improvements of this needle polishing process related to methods of making this standard operation more susceptible to automatization or giving it better results, but the principle of this method itself remains still the same, and still causes considerable production delay and labor costs.

The present invention provides a process for smoothing the eye of a needle including the step of subjecting an area of the needle adjacent the eye to one or more pulses of high power density radiation to melt the surface of said area, and subsequentially permitting said surface to solidify thereby to smooth said surface.

It is important that such irradiation has its effect only very locally at the area to be smoothed, which may be a spot on the order of 1 square millimeter or less, so that the surrounding metal remains unaffected and its temperature rise negligible. This is possible if this area can be irradiated for only a very short time, on the order of milliseconds, negligible for heat conduction from the area to the surrounding metal, and with sufficient power density to bring the surface material in this area above melting temperature. This power density is in the range above $1 \times 10^5$ watt per square centimeter. Power density above this limit is referred to herein as "high power density." Such an irradiation beam need not necessarily be a beam of electromagnetic waves but may also be an electron beam which is directed towards the hot spot, or a hot plasma arc. The irradiation time is kept short and is adapted so as to bring sufficient melting energy to the surface material of the hot spot, but not so much as to evaporate it or at least not to evaporate a substantial part of the melted material, in such a way that the melted material after irradiation substantially solidifies again.

Preferably, a laser beam is used for the high power density irradiation. It has the advantage over other types of high-power density irradiation that power absorption is much more concentrated at the surface because absorption depth of laser irradiation is low, and so, less power density is required for smoothing the surface. The distance between beam source and workpiece can also be made sufficiently great for permitting easy replacement and observation of the needles, and there are no vacuum or atmosphere conditions for the laser beam, which is an electromagnetic wave beam, generally chosen in the frequency of visible red or infrared light (wavelength in the range between about $0.7\mu$ and $40\mu$), which is the frequency necessary for working metals by irradiation heat. Such beams are not disturbed by magnetic fields, and can be deflected and split up by known optical means, and do not produce dangerous X-rays which would require protection of the operator.

Preferably a pulsed solid-state laser is used, e.g., ruby-laser or neodymium doped YAG-lasers (Yttrium-Aluminum Garnet as resonance medium).

Because of its operation in pulses, such lasers can more easily be cooled and provide much more power density during the pulse duration, in the range of about $1 \times 10^{11}$ watt/cm$^2$ and more, in its focusing spot. And so, when less focusing is needed to strike a surface of the order of 1 mm$^2$, it can easily reach the necessary power density of at least $1 \times 10^5$ watt/cm$^2$ over the whole surface.

The duration of the pulse, in order to melt the material by one single irradiation pulse, need only be of a few milliseconds as explained above and must be carefully controlled, and this is precisely what is possible with existing solid-state pulse lasers. The necessary duration of the pulse will depend on the necessary total energy to be directed towards the hot spot, and on the form of the pulse. The necessary total energy to be directed towards the hot spot depends mainly on the geometry of the hot spot to be created, which determines the total energy to be absorbed in the hot spot. From this it can be deducted that the necessary irradiation energy is determined by the energy to be absorbed and by the absorption coefficient of the material of the work-piece. It is known that the latter strongly varies with the power density of the incident beam. For low power densities, only a small part of the light is absorbed and not reflected, whereas for high power densities a very large part is absorbed. So, it can be seen that the total energy to be directed towards the hot spot depends on the order of magnitude of the irradiation power density, on the form of the pulse, and on the geometry of the surface to be smoothed.

The exact pulse time for each application will thus depend on the type of laser apparatus used, and on the type of needle, and can easily be found by experimentation over several pulse durations. A conventional laser apparatus can be used, of the type now used for welding watch springs, producing a beam between 500 and 1000 watts, and provided with the necessary optical means to focus this beam onto a spot having a diameter between 0.2 and 1 mm with an average (over one pulse) irradiation power density on such spot between 100,000 and 1,000,000 watt/cm$^2$. Such apparatuses, when used for welding, procure a pulse with a sharply rising curve to high power density in order to rapidly bring the material to the melting point followed by a tail of lower power density in order to allow some limited conduction heating and to avoid evaporation of the molten material. When using such apparatus within this power range and producing such typical pulses for welding purposes, it may be said that the expected optimal total irradiation energy of one pulse will be in the range of 1 to 25 joule per square millimeter of the hot spot, most probably in the range of 5 to 10 joule per square millimeter. From this, the expected optimal pulse time can be calculated.

The use of a pulse laser is also appropriate for bringing, between successive pulses, a new needle under the objective of the apparatus, in such way that automatic feeding of the apparatus is possible. This feeding is also largely facilitated by the fact that the smoothing instrument does not exert any force on the needle, and so, the needle need not be strongly fixed in the feeding support in order to avoid movement of the needle during the smoothing operation.

As explained above, the eye is in a form elongated in the direction of the length of the needle thus defining two extremities. At these extremities, it is undesirable to have burrs in the internal surface of the eye nor is it desirable to keep any sharp edge at the edge formed between this internal surface and the external needle surface in which the hole is perforated. It is on this edge that the laser beam should be directed, at both extremities of the eye. The remaining part of the edge over the whole circumference of the hole may also be treated, although this is not absolutely necessary.

After the extremities of the eye have been struck by laser irradiation, in such a way that the surface material has been melted and solidified again, the edge is rounded off and the surface is smooth. By smooth is meant that all roughnesses due to mechanical working, as clearly visible in a microscope of about 100 times magnification, has disappeared. Instead, when looking at carbon steel needles in a microscope of about 1000 times magnification, new surface irregularities can be preceived, which are typical for solidified steel. As is known, molten steel solidifies into a so-called "dendritic" grain structure. During solidification each grain grows in the form of a major branch and side branches, having the aspect of a fir tree. These "trees" are, after solidification, interlaced into each other and give a typical dendritic structure, well known by metallurgists.

This dendritic grain growth of the steel material gives at the surface also a dendritic surface irregularity pattern, which is the typical surface irregularity pattern for solidified carbon steel, visible in a microscope of around 1,000 times magnification, and easily identifiable by metallurgists. It is true that afterwards, in a further manufacturing step of the needle, the steel is hardened, which means heating to austenite and quenching to martensite. After this operation, inside the dendrites, the steel becomes martensitic and the dendritic grain boundaries more or less diffuse into each other, although not completely, but the dendritic surface irregularity pattern remains. In a further manufacturing step, this steel surface is further covered with a bright and rust-preventive layer (e.g., of nickel or chrome). So, a typical characteristic of the extremities of the elongated eye of which at least one extremity has been treated by the inventive process, resides in the fact that the steel surface, after removing the rust-preventive coating, has a dendritic surface structure at at least one of said extremities.

Some embodiments of the invention will now be described by way of example and with reference to the accompanying drawings, in which.

Figure 1:
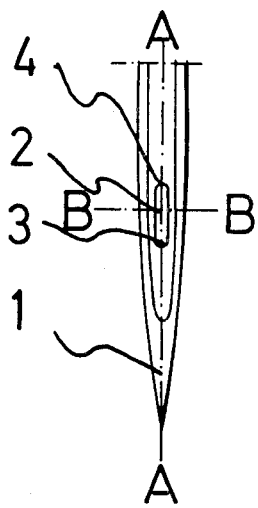
FIG. 1 is a front side view of the top of a needle for industrial sewing machines.
Figure 2:
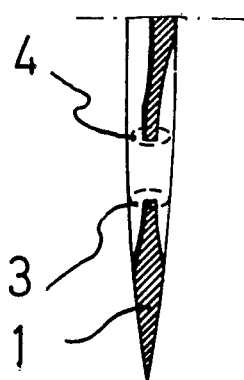
FIG. 2 is a cross-sectional view of the same needle, along the line AA of FIG. 1.
Figure 3:
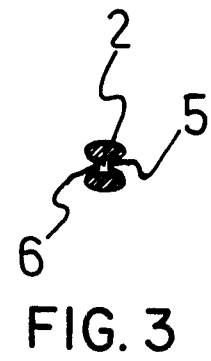
FIG. 3 is a cross-sectional view of the same needle, along the line BB of FIG. 1.
Figure 4:
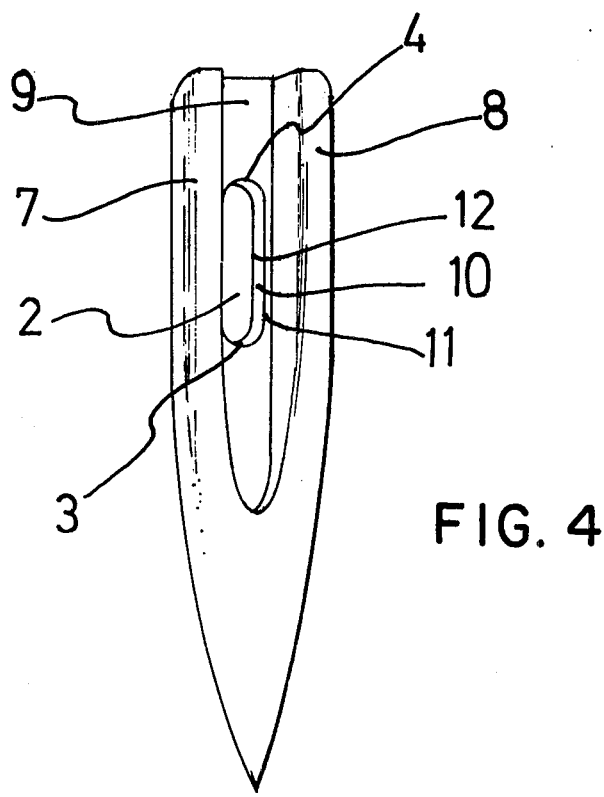
FIG. 4 is a perspective view of the front side of the same top of a needle.

As shown in FIGS. 1 through 3, the needle has an eye 2 of a form elongated in the longitudinal direction AA of the needle. This defines two extremities 3 and 4, lengthwise of the eye, which extremities are rounded off in the form of a half circle. The needle is provided with two grooves, 5 and 6, opposite to each other and running lengthwise of the eye. These grooves are visible in cross-section in FIG. 3, and groove 5 on the front side is visible in FIG. 4 between the rims 7 and 8. In the bottom of these grooves, the needle surface 9 forms with the internal surface 10 a right-angled edge 11 on the front side, and also another similar edge 12 on the back side around the circumference of the eye 2. These edges must be rounded off, and all burrs and surface irregularities must be smoothed off in the extremity regions 3 and 4, as they are encircled on FIG. 2, because it is against these edges that the thread is rubbed during sewing.

Figures 5, 6, 7:
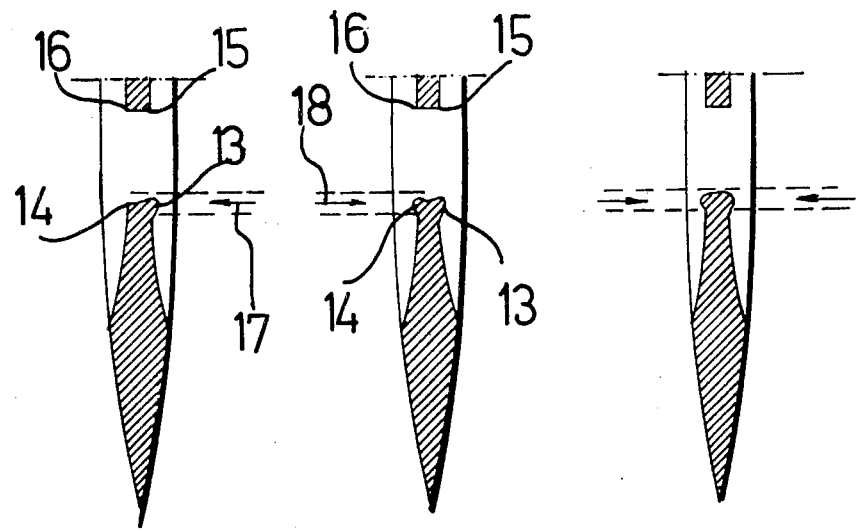
FIGS. 5 to 9 represent each a cross-sectional view, similar to FIG. 2 of a needle under different circumstances of irradiation in accordance with the invention.

Four edges must be smoothed (FIG. 5): on the front side in the extremity 3 there is edge 13 and in the extremity 4 there is edge 15. On the back side there are respectively edges 14 and 16. FIG. 5 shows how it is possible to firstly direct a laser beam 17, in the direction of the arrow, from a laser apparatus (not shown) at the front side of the needle onto edge 13. Subsequently, another laser beam 18 (FIG. 6) can then be directed in the direction of the arrow, from a laser apparatus on the back side of the needle onto edge 14. Each laser beam must be sufficiently strong to produce a molten spot for at least half the depth of the hole in order to have the internal surface completely smoothed. But it has been found that consecutive production of two hot spots, firstly on the front side over half of the total surface so as to smooth the extremity 3, and then on the back side over the remaining half, leaves in the middle an edge at the limit where fusion of the second hot spot stops. For that reason it is preferred to irradiate simultaneously the whole surface to be smoothed at extremity 3, i.e. both the edge 13 at the front side and the edge 14 at the back side. This irradiation can then be provided by two laser beams impinging simultaneously on edges 13 and 14 (FIG. 7) to cause the molten steel spots to flow into each other and to solidify as one molten mass.

Figures 8, 9:
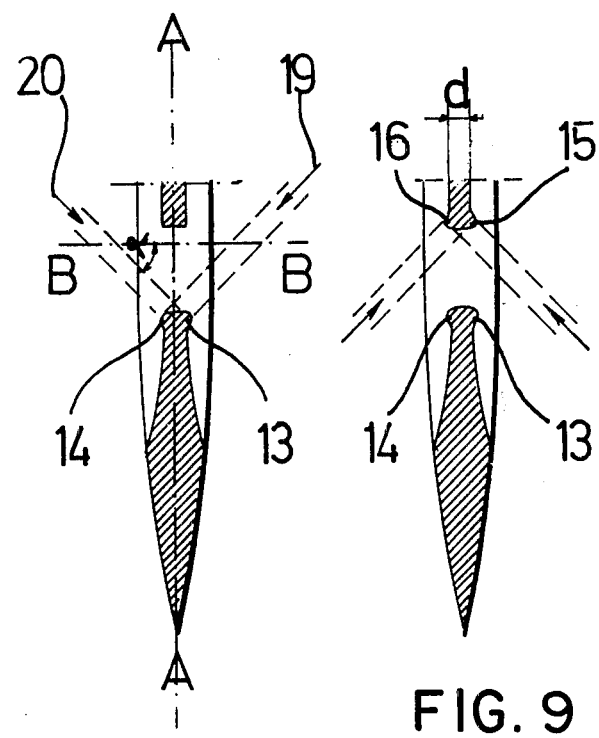

If the laser beam is directed perpendicularly onto the front and back sides of the needle (FIGS. 5, 6 and 7) then there is always a lost part of the beam which skims the internal surface of the hole and passes through it, instead of impinging upon the steel. This lost part can be redirected, by suitable prisms and other optical reflectors, towards the steel surface. However, in order to avoid a part of the beam passing through the hole, each beam may be directed in an oblique direction onto the edges 13 and 14. In that case (FIG. 8), each of the laser beams 19 and 20 has a centerline that lies in the plane corresponding to the longitudinal direction AA of the needle and the direction BB of the perforation of the hole constituting the eye of the needle. This means in the case of FIG. 8, that the centerlines of beams 19 and 20 lie in the plane of the drawing. They form an acute angle $\mu$ with the direction BB. After this double beam has smoothed the edges 13 and 14 in the extremity 3, another double beam then smooths the edges 15 and 16 in the extremity 4 (FIG. 9). It must be noted that all these different beams need not necessarily have their provenance from different laser generators, but the beam coming out of one generator may be split up and reflected in different directions by a suitable system of prisms or other suitable deflection means.

After treatment of the needle, the edges 13 and 14 solidify together into a sort of bulbous form, as seen in cross-section in FIG. 9; this cross-section is in a plane comprising the longitudinal direction of the needle and the direction of perforation of the eye. In fact, the molten part forms a liquid drop and a thickening at the extremity, thicker than the thickness d (FIG. 9) of the steel in which the hole was punched, and then solidifies again. Such thickening is what is meant here by bulbous shape, which can easily be seen under a magnifying glass. It is believed that this form also improves the friction characteristics of the thread in the eye.

The laser apparatus which may be used for smoothing conventional industrial sewing machine needles is the LKS 15 system of the German firm Carl Haas. The operation characteristics and possibilities of this system are explained in the "Jahrbuch der Deutschen Gesellschaft für Chronometrie E.V.," Volume 24, 1973 (Stuttgart 1973) pages 91 to 107 in the article of W. H. Müller and P. Seiler "Ein neues Laser-komponenten-System für die Verfahrenstechnik im Microbereich." More specifically, the laser beam generator is a pulsed solid-state laser of the Neodymium doped YAG type. The resonator is a rod of 4 mm diameter, pumped with a Xenon-flash lamp of 2 inches arc-length. This lamp is lighted, as usual, by the discharge of an LC-circuit as an energy accumulator, which is charged in its turn by high-voltage transformation and rectification of the 220 volt mean voltage. The capacity of the accumulator can be regulated to control the pulse duration of the laser pulse. The ignition of the lamp occurs by means of an electronic clock-pulse generator which delivers a high frequency vibration wave in the secondary winding of a transformer, which is connected in series with the accumulator and the discharge lamp.

A focusing lens system provides the concentration of the laser beam to a small beam diameter on the point of impact which ranges between 50 and 100% of the breadth of the eye of the needle.

The laser beam pulses delivered by this apparatus are of maximum duration of 3 milliseconds and maximum energy of 2 Joule per pulse.

Two identical generators are used for each side of the needle. It is however clear that any other laser apparatus designed for microwelding steel parts, producing a laser beam of 50 to 1000 watt in the red to infra-red range (wavelength of 0.7 to 40$\mu$ and more), and which can be concentrated on a hot spot in the range of 0.2 to 1 mm diameter, can be used for this purpose. The irradiation power of these apparatuses used for welding is in general such that after focusing with the included optical system into a spot of such dimensions, the irradiation power density (watt/cm$^2$) can be brought to the optimum range (about 100,000 to 1,000,000 watt/cm$^2$) for fusion without excessive evaporation and excessive conduction loss to the adjacent steel material. The LKS 15 system has been used for welding balance springs in watches and proves to be well suited for the present invention.

As already explained, the exact duration of the pulse will depend on the type of apparatus used, and the type of needle, and can easily be found by a first short experiment. With the LKS 15 system, the necessary duration was the maximum duration of 3 milliseconds, and the focused beam had a diameter of 0.5 mm.

The system is very susceptible to automatic operation. The needles may arrive one after the other under the objective of the laser apparatus by use of any transportation system well known in the art for use in other similar apparatuses for accurate mechanical treatment of needles. The design of such a system is made easier as the needles are not submitted to mechanical forces during treatment. Between consecutive pulses of the apparatus, a new needle is brought under the objective.

This invention is not limited to smoothing needles for industrial sewing machines, but is also applicable to needles for domestic use. Although laser radiation is seen here as the preferred solution it is clear that one can alternatively use another high power density irradiation beam, such as an electron beam.

What I claim is:

1. A process for smoothing the eye of a needle including the step of subjecting an area of the needle eye to one or more pulses of high power density radiation to melt the surface of said area, and subsequently permitting said surface to solidify thereby to smooth said surface.

2. A process according to claim 1 wherein said radiation is produced by a pulsed laser.

3. A process according to claim 2 wherein the laser is a ruby-laser or a neodymium doped YAG-laser.

4. A process according to claim 2 wherein a single pulse is employed to provide said melting.

5. A process according to claim 4 wherein the irradiation power density lies between $10^5$ and $10^6$ watt per square centimeter, and the energy per pulse of the laser beam lies in the range of 1 to 25 Joule per square millimeter of surface of incidence of the beam.

6. A process according to claim 5 wherein the beam diameter on the point of impact is between 0.2 and 1 millimeter.

7. A process according to claim 2 in which the eye of the needle is elongate in the direction of the length of the needle, wherein areas of the needle at both extremities of said eye are subjected to said radiation.

8. A process according to claim 7 wherein to smooth the surface at one extremity of the eye at least two laser beams are directed simultaneously from each side of the hole constituting the eye of the needle.

9. A process according to claim 8 wherein the beam diameter on the point of impact is between 50 to 100% of the breadth of the eye of the needle.

10. A process according to claim 8 wherein the axis of each beam is disposed at an acute angle to the longitudinal direction of the needle.

11. A needle manufactured according to claim 1.

12. A process according to claim 1 in which the eye of the needle is elongate in the direction of the length of the needle, wherein areas of the needle at both extremities of said eye are subjected to said radiation.

13. A process according to claim 12 wherein said radiation is produced by a pulsed laser.

14. A process according to claim 13 wherein a single pulse is employed to provide said melting.

15. A process according to claim 13 wherein the laser is a ruby-laser or a neodymium doped YAG-laser.

16. A process according to claim 15 wherein a single pulse is employed to provide said melting.

17. A process according to claim 14 wherein the irradiation power density lies between $10^5$ and $10^6$ watt per square centimeter, and the energy per pulse of the laser beam lies in the range of 1 to 25 Joule per square millimeter of surface of incidence of the beam.

18. A process according to claim 17 wherein the beam diameter on the point of impact is between 0.2 and 1 millimeter.

19. A process according to claim 3 wherein a single pulse is employed to provide said melting.

20. A process according to claim 19 wherein the irradiation power density lies between $10^5$ and $10^6$ watt per square centimeter, and the energy per pulse of the laser beam lies, in the range of 1 to 25 Joule per square millimeter of surface of incidence of the beam.

21. A process according to claim 20 wherein the beam diameter on the point of impact is between 0.2 and 1 millimeter.

22. A process according to claim 12 wherein to smooth the surface at one extremity of the eye at least two laser beams are directed simultaneously from each side of the hole constituting the eye of the needle.

23. A process according to claim 22 wherein the beam diameter on the point of impact is between 50 to 100 percent of the breadth of the eye of the needle.

24. A process according to claim 22 wherein the axis of each beam is disposed at an acute angle to the longitudinal direction of the needle.

25. A process according to claim 16 wherein the irradiation power density lies between $10^5$ and $10^6$ watt per square centimeter, and the energy per pulse of the laser beam lies in the range of 1 to 25 Joule per square millimeter of surface of incidence of the beam.

26. A process according to claim 25 wherein the beam diameter on the point of impact is between 0.2 and 1 millimeter.

27. A steel needle having an eye elongate in the direction of the length of the needle, wherein the surface of the steel at one or both of the extremities of the eye has a dendritic structure.

28. A needle according to claim 27 wherein at one or both extremities of the eye the needle has a bulbous shape in cross-section.

29. A needle having an eye smoothed by a process which includes the step of subjecting an area of the needle eye to one or more pulses of high power density radiation to melt the surface of said area and subsequently permitting said surface to solidify thereby to smooth said surface.

30. A needle according to claim 29 wherein said radiation is produced by a pulsed laser.

31. A needle according to claim 30 wherein a single pulse is employed to provide said melting.

32. A needle according to claim 31 wherein the irradiation power density lies between $10^5$ and $10^6$ watt per centimeter, and the energy per pulse of the laser beam lies in the range of 1 to 25 Joule per square millimeter of surface of incidence of the beam.

33. A needle according to claim 32 wherein the beam diameter on the point of impact is between 0.2 and 1 millimeter.

34. A needle according to claim 29 wherein the eye of the needle is elongate in the direction of the length of the needle and wherein areas of the needle at both extremities of said eye are subjected to said radiation.

35. A needle according to claim 34 wherein to smooth the surface at one extremity of the eye at least two laser beams are directed simultaneously from each side of the hole constituting the eye of the needle.

36. A needle according to claim 35 wherein the beam diameter on the point of impact is between 50 to 100 percent of the breadth of the eye of the needle.

37. A needle according to claim 35 wherein the axis of each beam is disposed at an acute angle to the longitudinal direction of the needle.

38. A needle according to claim 29 having an eye elongate in the direction of the length of the needle, wherein at one or both of the extremities of the eye the needle has a bulbous shape in cross-section.

* * * * *